(12) United States Patent
Saila et al.

(10) Patent No.: US 9,179,561 B2
(45) Date of Patent: Nov. 3, 2015

(54) FLEXIBLE APPARATUS STRUCTURE

(71) Applicant: Nokia Corporation, Espoo (FI)

(72) Inventors: Sami Saila, Halikko (FI); Antti Salo, Lohja (FI)

(73) Assignee: Nokia Technologies Oy, Espoo (FI)

( * ) Notice: Subject to any disclaimer, the term of this patent is extended or adjusted under 35 U.S.C. 154(b) by 146 days.

(21) Appl. No.: 13/719,567

(22) Filed: Dec. 19, 2012

(65) Prior Publication Data

US 2014/0168880 A1 Jun. 19, 2014

(51) Int. Cl.
*G06F 1/16* (2006.01)
*H05K 5/02* (2006.01)

(52) U.S. Cl.
CPC .. *H05K 5/02* (2013.01); *G06F 1/16* (2013.01); *G06F 1/1601* (2013.01); *G06F 1/1613* (2013.01); *G06F 1/1626* (2013.01); *G06F 1/1633* (2013.01); *G06F 1/1652* (2013.01)

(58) Field of Classification Search
CPC ... G06F 1/1601; G06F 1/1613; G06F 1/1626; G06F 1/1633; G06F 1/1652
USPC ............... 361/679.21, 679.22, 679.26, 679.3, 361/679.01; 455/575.1, 575.4, 575.8
See application file for complete search history.

(56) References Cited

U.S. PATENT DOCUMENTS

| | | | | |
|---|---|---|---|---|
| 5,532,711 A | * | 7/1996 | Harris | 345/55 |
| 7,368,307 B2 | * | 5/2008 | Cok | 438/26 |
| 8,380,327 B2 | * | 2/2013 | Park | 700/1 |
| 2006/0273304 A1 | * | 12/2006 | Cok | 257/40 |
| 2010/0073593 A1 | * | 3/2010 | Sasaki et al. | 349/58 |
| 2013/0076649 A1 | * | 3/2013 | Myers et al. | 345/173 |
| 2013/0083496 A1 | * | 4/2013 | Franklin et al. | 361/749 |

* cited by examiner

*Primary Examiner* — Anthony Haughton
(74) *Attorney, Agent, or Firm* — Harrington & Smith

(57) ABSTRACT

An apparatus including a glass window, a front cover, a back cover, and an elastic frame. The elastic frame is configured to form at least a first neutral plane and a second neutral plane.

13 Claims, 4 Drawing Sheets

FLEXIBLE APPARATUS STRUCTURE

TECHNICAL FIELD

The present invention generally relates to a flexible apparatus structure.

BACKGROUND ART

Portable electronic devices have begun to dominate consumer electronic markets and possess an increasing market share. Small size, thin structures and low weight combined with intuitive and enjoyable user interfaces provide mobile users with an enhanced user experience.

Generally electronic devices have a rigid structure. An elastic, flexible or bendable portable device is desirable in many situations. Such a device should retain the other outstanding qualities of state-of-the-art portable devices, such as tablet computers or smartphones.

SUMMARY

According to an example aspect of the invention there is provided an apparatus comprising:
 a glass window;
 a front cover;
 a back cover; and
 an elastic frame; wherein
  the elastic frame is configured to form at least a first neutral plane and a second neutral plane.

The position of the first neutral plane may correspond to the position of the glass window and the position of the second neutral plane may correspond to the position of the back cover.

The elastic frame may be configured to form at least one further neutral plane.

The apparatus may further comprise a resilient internal structure configured to substantially maintain the distance between the front cover and the back cover.

The resilient internal structure may comprise a resilient material or a resilient structure.

The resilient internal structure may comprise at least one substantially rigid pillar.

The elastic frame may be configured to deform for compensating the relative movement of the front and back cover.

The glass window may be attached from the rim thereof to the elastic frame.

The apparatus may further comprise a touch sensitive display attached to the glass window.

The back cover may further comprise elastic sections.

The elastic sections may comprise sensing elements for receiving user input.

The glass window may further comprise at least one optical grating for changing the viewing angle through the glass window when bent.

Then apparatus may further comprise
 a memory;
 a communications unit; and
 a processor.

The processor may be configured to change an operating mode of the apparatus or receive user input in response to the apparatus being bent.

The apparatus may comprise at least one of a tablet computer, a smartphone, an e-book reader or a display.

A non-binding example aspect and embodiments of the present invention have been illustrated in the foregoing. The above embodiments are used merely to explain selected aspects or steps that may be utilized in implementations of the present invention.

BRIEF DESCRIPTION OF THE DRAWINGS

The invention will be described, by way of example only, with reference to the accompanying drawings, in which.

DETAILED DESCRIPTION

Some example embodiments of the present invention and potential advantages are understood by referring to FIGS. 1a through 8c of the drawings.

Figures 1A, 1B:
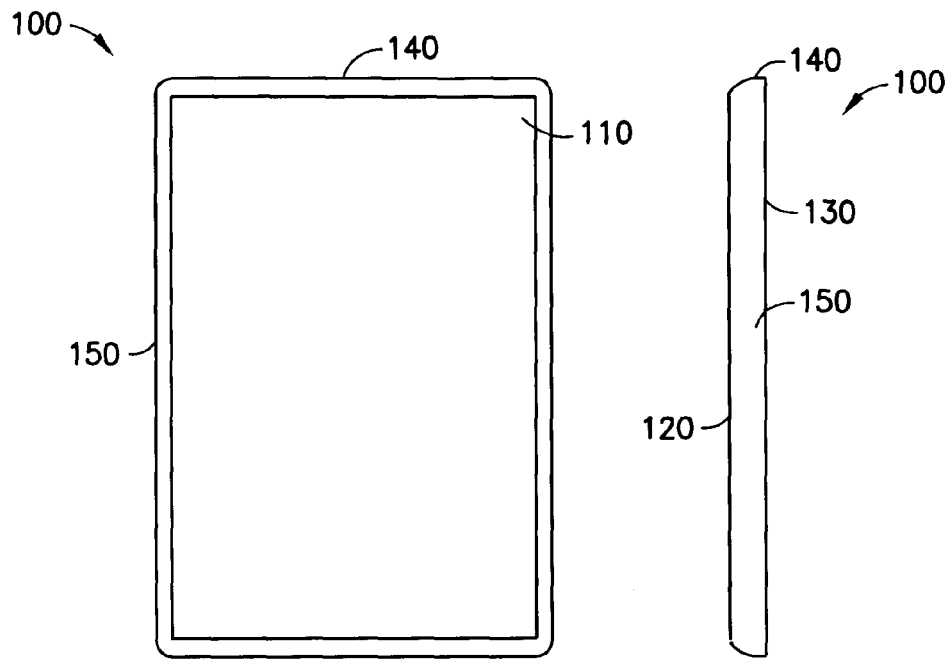
FIG. 1a shows a schematic front view of an apparatus according to an example embodiment of the invention.
FIG. 1b shows a schematic side view of an apparatus according to an example embodiment of the invention.

FIG. 1a shows a schematic front view of an apparatus according to an example embodiment of the invention. The apparatus 100 is for example a tablet computer, a personal digital assistant, a smartphone, a media player, an e-book reader, a display or a flat-screen television. The apparatus 100 according to an example embodiment, comprises a user interface unit 110, such as a touch sensitive display at least on one surface of the apparatus. In an example embodiment, the apparatus comprises a front surface 130, a back surface 120, and four sides 140,150. In an example embodiment, the apparatus 100 is substantially rectangular.

The touch sensitive display 110 comprises a touch sensor for detecting the touch of the user on or in proximity thereof. In an example embodiment, the touch sensor comprises a resistive, a surface acoustic wave, a capacitive—such as a surface capacitance, a projected capacitance, a mutual capacitance, or self-capacitance—an infrared, an optical, a dispersive signal and/or acoustic pulse recognition touch sensor or an array thereof. A skilled person appreciates that the user interface unit, in a further example embodiment, comprises further elements such as hardware or soft buttons or further display units. In a further example embodiment, the user interface unit 110 is covered with a glass window. In a further example embodiment, the apparatus 100 is controlled with further methods such as by voice recognition, by tracking eye movement of the user, by recognizing facial expressions of the user, or by recognizing movements or gestures of the user.

Figure 2:
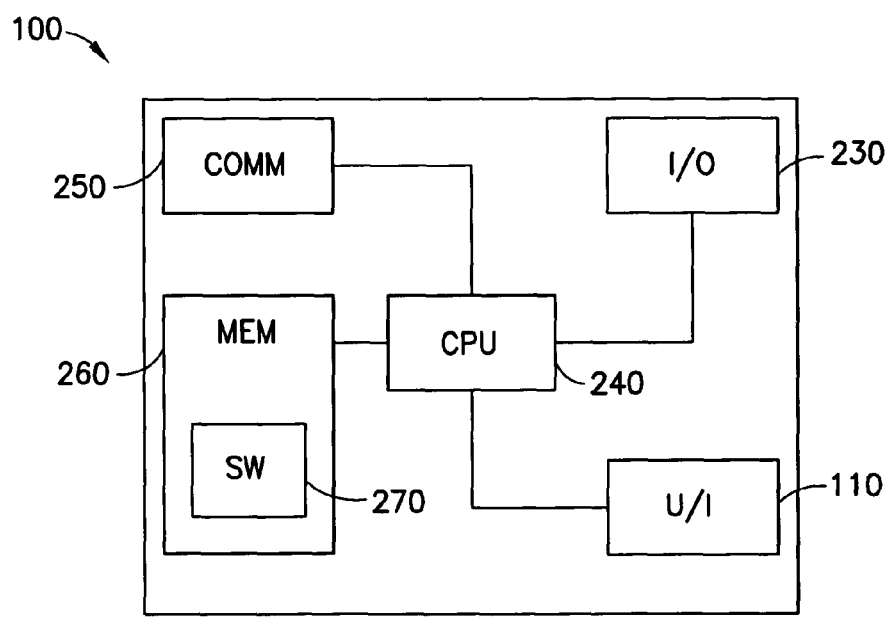
FIG. 2 shows a schematic block diagram of an apparatus according to an example embodiment of the invention.

FIG. 2 shows a schematic a block diagram of an apparatus 100 of an example embodiment. The apparatus 100 comprises a communication interface module 250, a processor 240 coupled to the communication interface module 250, and a memory 260 coupled to the processor 240. The apparatus further comprises and input/output (I/O) unit 230 and the user interface (U/I) unit 110, such as a touch sensitive display, which are coupled to the processor 240.

The memory 260 comprises a work memory and a non-volatile memory such as a read-only memory, flash memory, optical or magnetic memory. In the memory 260, typically at least initially in the non-volatile memory, there is stored software 270 operable to be loaded into and executed by the processor 240. The software 270 may comprise one or more software modules and can be in the form of a computer program product that is software stored in a memory medium. In the context of this document, a "memory medium" may be any non-transitory media or means that can contain, store, communicate, propagate or transport the instructions for use by or in connection with an instruction execution system, apparatus, or device, such as a computer.

It shall be understood that any coupling in this document refers to functional or operational coupling; there may be intervening components or circuitries in between coupled elements unless expressly otherwise described.

The communication interface module 250 is configured to provide local communications over one or more local links. The links may be wired and/or wireless links. The communication interface 250 may further or alternatively implement telecommunication links suited for establishing links with other users or for data transfer, e.g. using the Internet. Such telecommunication links may be links using any of: wireless local area network links, Bluetooth, ultra-wideband, cellular or satellite communication links. The communication interface 250 may be integrated into the apparatus 100 or into an adapter or card that may be inserted into a suitable slot or port of the apparatus 100. While FIG. 2 shows one communication interface 250, the apparatus may comprise a plurality of communication interfaces 250. In a further example embodiment, the apparatus 100 further comprises a near field communication (NFC) unit.

The processor 240 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one processor 240, but the apparatus 100 may comprise a plurality of processors. In an example embodiment, the apparatus 100 comprises a sensing element or a functionality implemented with the processor for detecting whether the apparatus is bent and the processor is configured to, in response to the apparatus being bent to change an operating mode of the apparatus, e.g. from a power-saving mode to a browsing mode, or to receive user input.

As mentioned in the foregoing, the memory 260 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage or a smart card. In some example embodiments, only volatile or non-volatile memory is present in the apparatus 100. Moreover, in some example embodiments, the apparatus comprises a plurality of memories. In some example embodiments, various elements are integrated. For instance, the memory 260 can be constructed as a part of the apparatus 100 or inserted for example into a slot or a port. Further still, the memory 260 may serve the sole purpose of storing data, or it may be constructed as a part of an apparatus serving other purposes, such as processing data. Similar options are thinkable also for various other elements.

A skilled person appreciates that in addition to the elements shown in FIG. 2, the apparatus 100 may comprise other elements, such as microphones, displays, as well as additional circuitry such as a camera unit, further input/output (VO) circuitries, memory chips, application-specific integrated circuits (ASIC), processing circuitry for specific purposes such as source coding/decoding circuitry, channel coding/decoding circuitry and ciphering/deciphering circuitry. Additionally, the apparatus 100 may comprise a disposable or rechargeable battery (not shown) for powering the apparatus if external power supply is not available.

It is also useful to realize that the term apparatus is used in this document with varying scope. In some of the broader claims and examples, the apparatus may refer to only a subset of the features presented in FIG. 2 or even be implemented without any one of the features of FIG. 2. In an example embodiment term apparatus refers to the processor 240.

Figure 3A:
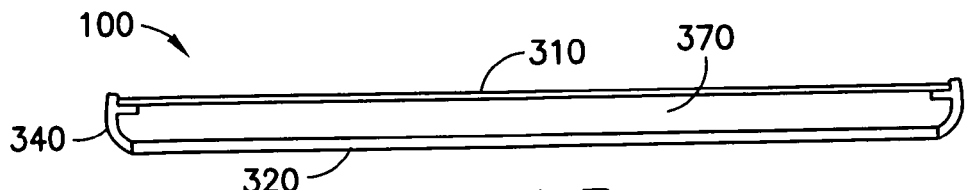
FIG. 3a shows a schematic side view of an apparatus according to an example embodiment of the invention in an unbent position.
Figure 3B:
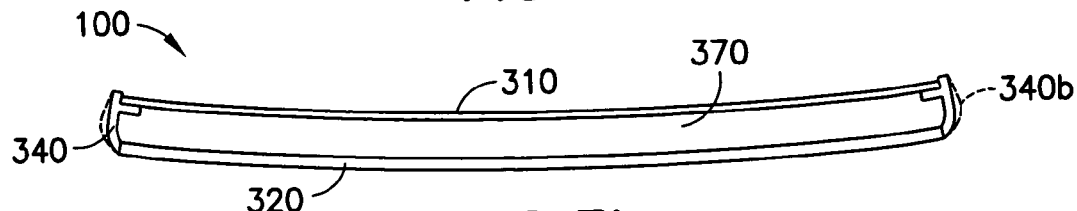
FIG. 3b shows a schematic side view of an apparatus according to an example embodiment of the invention in a concavely bent position.
Figure 3C:
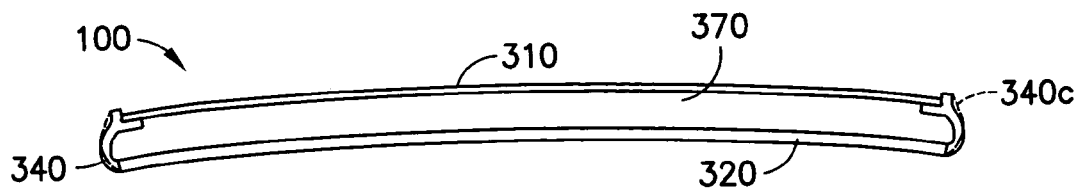
FIG. 3c shows a schematic side view of an apparatus according to an example embodiment of the invention in a convexly bent position.

FIGS. 3a to 3c show a schematic side view of an apparatus according to an example embodiment of the invention in an unbent, in a concavely bent and in a convexly bent position, respectively. The apparatus comprises a back, or bottom, cover 320 and a resilient, or elastic, internal structure, or material, 370 (not shown for intelligibility). The apparatus 100 further comprises a glass window 310. A skilled person appreciates that in an example embodiment, the front, or top, cover of the apparatus 100 comprises further structures (not shown for intelligibility) in addition to the glass window 310. A skilled person further appreciates that in a further example embodiment, the glass window 310 comprises a window of a further material with properties substantially similar to glass, such as plastic. The apparatus 100 further comprises an elastic, i.e. flexible or resilient, frame 340. In an example embodiment, the glass window 310 covers the user interface unit 110, i.e. the touch sensitive display (not shown). In a further example embodiment, the components of the user interface unit, such as a display stack, are integrated with or attached mechanically to the glass window 310. In a further example embodiment, the glass window 310 comprises optical gratings in the surface thereof for adjusting the viewing angle by bending the apparatus. In a further example embodiment, the front cover of the apparatus 100 comprises a separate privacy filter for adjusting the viewing angle by bending the apparatus 100. The flexible apparatus structure according to example embodiments described hereinbefore and hereinafter makes it possible to integrate a glass window 310, or a plastic window with substantially similar properties, into a flexible apparatus.

The resilient internal structure 370 comprises in an example embodiment resilient materials, such as a gel, an elastomer, foam, rubber or silicone. In a further example embodiment, the resilient internal structure 370 comprises in addition or instead of a resilient material resilient structures such as hollow, woven, folded or coiled structures, or a folding membrane of e.g. thin polymer of fabric. In a further example embodiment, the resilient internal structure 370 comprises substantially rigid components as described hereinafter with reference to FIG. 6a. In a further example embodiment, the apparatus 100 is substantially hollow. In the outer surface of the apparatus 100 there are no moving, sliding or colliding parts in the structure and any noise from flexing the structure is substantially eliminated and the outer surfaces of the apparatus remain smooth and continuous.

Figure 4A:
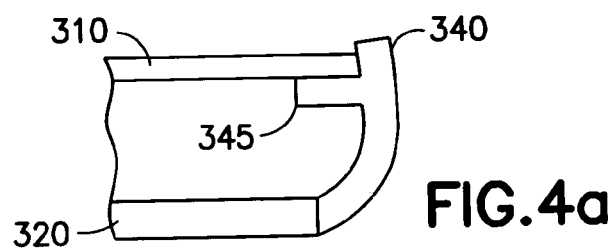
FIG. 4a shows an enlarged schematic view of the elastic frame of an apparatus according to an example embodiment of the invention in an unbent position.
Figure 4B:
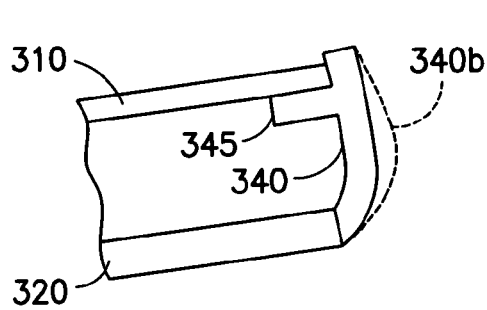
FIG. 4b shows an enlarged schematic view of the elastic frame of an apparatus according to an example embodiment of the invention in a concavely bent position.
Figure 4C:
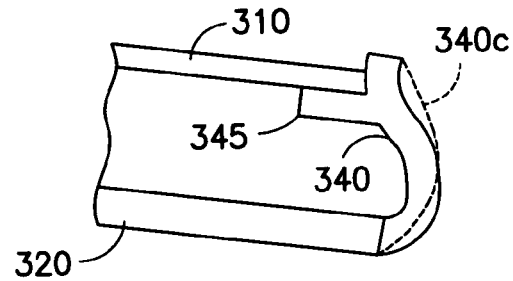
FIG. 4c shows an enlarged schematic view of the elastic frame of an apparatus according to an example embodiment of the invention in a convexly bent position.

FIGS. 4a to 4c show an enlarged view of the elastic frame of the apparatus 100, respectively. The apparatus 100 according to an example embodiment comprises the glass window 310, the back cover 320 and the elastic frame 340. As the device is bent, the elastic frame 340 deforms to compensate for relative movement of the glass window 310 and the back cover 320. FIGS. 4b and 4c show a comparison of the elastic frame profile 340b,340c in a bent state of the apparatus with that of the unbent state. A skilled person appreciates that, in an example embodiment further parts of the apparatus, e.g. the front cover and/or the back cover comprise, at least in part, elastic materials.

In an example embodiment, the glass window 310 is attached from the rim thereof to the elastic frame 340. In an example embodiment, the elastic frame is formed in such a way as to have a protrusion, or shelf, 345 on which the rim of the glass window is attached. A skilled person appreciates that the attachment of the glass window is carried out e.g. with procedures such as gluing, gluing with uv-curable material or ultrasonic welding.

Figure 7A:
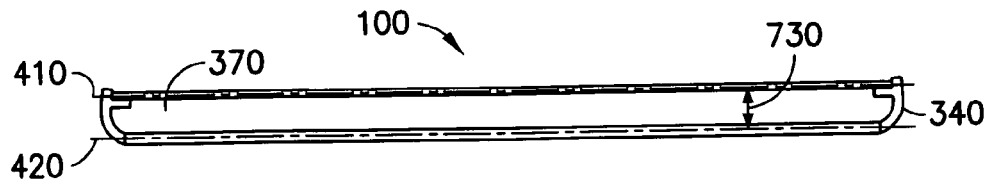
FIG. 7a shows a schematic side view of an apparatus according to an example embodiment of the invention in an unbent position.
Figure 7B:
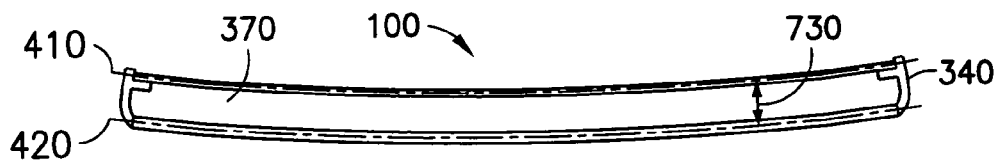
FIG. 7b shows a schematic side view of an apparatus according to an example embodiment of the invention in a concavely bent position.
Figure 7C:
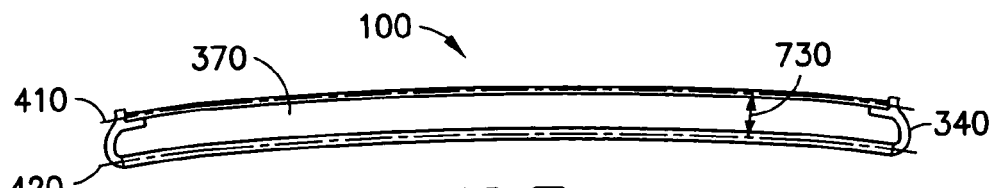
FIG. 7c shows a schematic side view of an apparatus according to an example embodiment of the invention in a convexly bent position.

Also referring to FIG. 7, the elastic frame 340 is configured to form or provide at least two neutral planes 410,420 inside the apparatus 100, i.e. planes the length of which does not change and which are not subjected to longitudinal stresses or strains as the apparatus 100 is, and the planes are, bent, although outside the neutral plane, tension or compression stresses occur. In an example embodiment, as depicted in FIGS. 7a to 7c, the elastic frame 340 is arranged in such a way that the position of the first neutral plane 410 corresponds to the position of the glass window 310 and the position of the second neutral plane 420 corresponds to the position of the back cover 320. A skilled person appreciates that in a further example embodiment, the elastic frame 340 is arranged in such a way as to provide further neutral planes positioned in such a way as to reduce stresses in further components of the apparatus 100.

The elastic frame 340 comprises, in an example embodiment, a gel or an elastomer. In a further example embodiment, the elastic frame comprises in addition to or instead of a gel or an elastomer further resilient materials and/or structures such as fabrics, leather or thin metal membranes. In a further example embodiment, elastic frame 340 comprises a gap or gaps between the neutral planes. As seen in FIGS. 4b and 4c, the elastic frame is configured to deform when the apparatus 100 is bent and thus to provide the neutral planes 410,420 (FIG. 7). The glass window 310 and the back cover 320 of the apparatus are bendable or flexible, but substantially not stretchable or compressible, and accordingly, as the apparatus is bent, the elastic frame 340 deforms in order to provide the neutral planes 410,420. In a further example embodiment, the elastic frame 340 seals the apparatus in such a way as to substantially provide a water-tight and or air-tight sealing FIGS. 5a to 5e show enlarged schematic views of the elastic frame of an apparatus according to example embodiments of the invention. Examples of the profile of the elastic frame and the attachment position of the glass window 310 and the back cover 320 according to example embodiments are depicted.

Figure 5A:
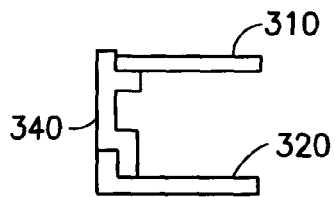
FIG. 5a shows an enlarged schematic view of the elastic frame of an apparatus according to an example embodiment of the invention.

FIG. 5a shows a profile according to an example embodiment, wherein the back cover 320 extends to the outer side of the elastic frame. A skilled person appreciates that in an example embodiment, the height of the elastic frame substantially corresponds with the thickness of the apparatus 100. In a further example embodiment, the height of the elastic frame is smaller than the thickness of the apparatus 100.

Figure 5D:
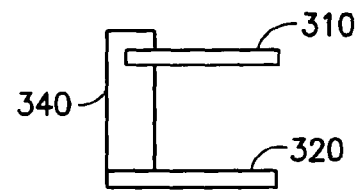
FIG. 5d shows an enlarged schematic view of the elastic frame of an apparatus according to an example embodiment of the invention.
Figure 5C:
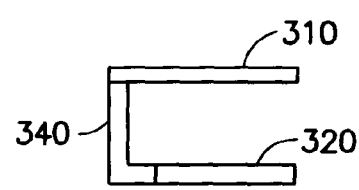
FIG. 5c shows an enlarged schematic view of the elastic frame of an apparatus according to an example embodiment of the invention.
Figure 5B:
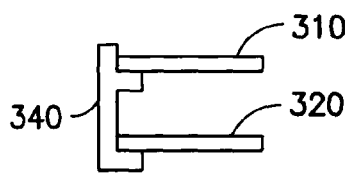
FIG. 5b shows an enlarged schematic view of the elastic frame of an apparatus according to an example embodiment of the invention.

FIG. 5b shows a profile of the elastic frame according to an example embodiment, wherein the elastic frame 340 extends over the back cover 320. The portions of the elastic frame 340 extending over the surface of the glass window 310 and/or the back cover 320 provide impact protection for the glass window 310 and/or back cover 320 when the apparatus 100 is placed or even dropped on a hard surface, such as a tabletop.

Figure 5E:
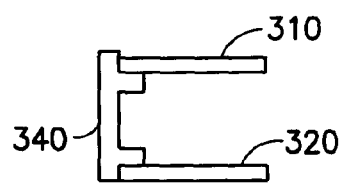
FIG. 5e shows an enlarged schematic view of the elastic frame of an apparatus according to an example embodiment of the invention.

FIG. 5c shows a profile of the elastic frame according to an example embodiment wherein the glass window 310 is attached on the top of the elastic frame 340 providing a visually pleasing front surface for the apparatus 100. FIG. 5d shows a profile of the elastic frame according to an example embodiment wherein the glass window 310 is attached into a gap or intrusion formed in the elastic frame 340. FIG. 5e shows a profile of the elastic frame according to an example embodiment wherein both the glass window 310 and the back cover 320 are attached on protrusions or shelves formed on the elastic frame.

Figure 6A:
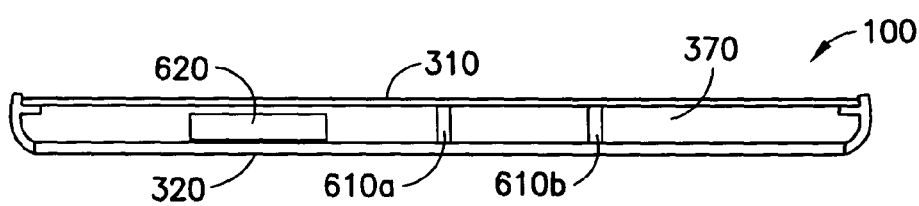
FIG. 6a shows a schematic side view of an apparatus according to an example embodiment of the invention in an unbent position.

FIG. 6a shows a schematic side view of an apparatus according to an example embodiment of the invention in an unbent position. In an example embodiment, a component, or element or functional unit, of the apparatus 620 is comprised in the resilient internal structure 370. In an example embodiment, the component 620 is attached to the glass window 310 or to the back cover 320 with e.g. a screw, several screws, by adhesion, or by integration into the cover 320. In a further example embodiment, the component 620 is not attached to the glass window 310 or to the back cover 320 but floats in the space therebetween and/or is embedded in a material in the space between the glass window 310 and the back cover 320. A skilled person appreciates that although one component 620 is shown, the apparatus comprises one or more components. In a further example embodiment, the components are attached to each other and then attached to the back cover 320 or to the glass window 310 from a shared attachment point.

In an example embodiment, the resilient internal structure 370 comprises in addition to or instead of the materials and structures hereinbefore described, substantially rigid pillars, or ribs, 610a,610b that support the structure of the apparatus 100. The pillars 610a,610b provide for stability and are configured to substantially maintain the distance between the back cover 320 and the glass window 310. A skilled person appreciates that although two pillars 610a,610b are shown, the apparatus 100, in an example embodiment, comprises one or more pillars.

Figure 6B:
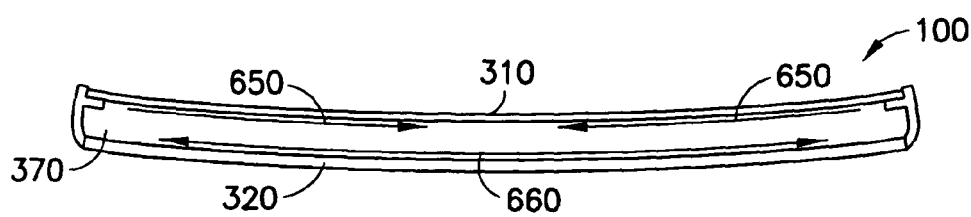
FIG. 6b shows a schematic side view of an apparatus according to an example embodiment of the invention in a concavely bent position.
Figure 6C:
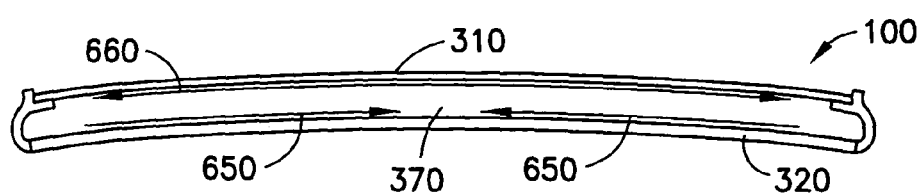
FIG. 6c shows a schematic side view of an apparatus according to an example embodiment of the invention in a convexly bent position.

FIG. 6b shows a schematic side view of an apparatus according to an example embodiment of the invention in a concavely bent position and FIG. 6c shows a schematic side view of an apparatus according to an example embodiment of the invention in a convexly bent position. Arrows 650,660 illustrate compressive and stretching stresses on the structure 370. The elastic frame 340 compensates the relative movement between front and back surfaces of the apparatus 100. As the apparatus 100 is bent concavely or convexly, the front and back covers of the apparatus 100 expand, and accordingly, the apparatus remains thin when bent and the back and front surface thereof remain smooth, i.e. the surfaces of the apparatus remain continuous. In an example embodiment, the resilient, or elastic, internal structure 370 is also plastic, i.e. comprises structures configured to maintain the bending angle without the user of the apparatus actively maintaining the bending angle.

FIGS. 7a to 7c show a schematic side view of an apparatus according to an example embodiment of the invention in an unbent, in a concavely bent and in a convexly bent position, respectively. As the large surfaces of the apparatus 100, for example a tablet computer, flat screen display, or a mobile phone, are not stretchable, i.e. the length and/or width of the surfaces should remain substantially same, the elastic frame 340 and the resilient internal structure 370 is configured to minimize the strain on the surfaces. Accordingly, the elastic frame 340 is configured to form or provide at least two neutral planes 410,420 inside the apparatus 100, i.e. planes the length of which does not change and which are not subjected to longitudinal stresses or strains as the apparatus 100 is, and the planes are, bent, although outside the neutral plane, tension or compression stresses occur. In a further example embodiment, the elastic frame 340 is arranged in such a way that the distance 730 between the neutral planes 410,420 remains substantially unchanged as the apparatus 100 is bent convexly or concavely an the apparatus 100 remains thin. In a further example embodiment, the distance 730 changes somewhat as the apparatus 100 is bent. A skilled person appreciates that although FIGS. 3a to 8c depict bending the apparatus, the structure of the apparatus provides for twisting the apparatus and/or for bending a portion of the apparatus to one direction and another portion of the apparatus to another direction.

In a further example embodiment, the elastic frame 340 is configured in such a way as to allow bending of the glass window 310 and/or the back cover 320 independent of the other, for example the glass window 310 is bent and the back cover 320 remains substantially straight. A skilled person appreciates that in such a case, the distance between the glass window 310 and the back cover 320 changes as one is bent independent of the other. A skilled person further appreciates, that in a further example embodiment the elastic frame 340 is configured in such a way as to allow both the glass window 310 and the back cover 320 to bend independently of each other, i.e. in different directions.

Figure 8A:
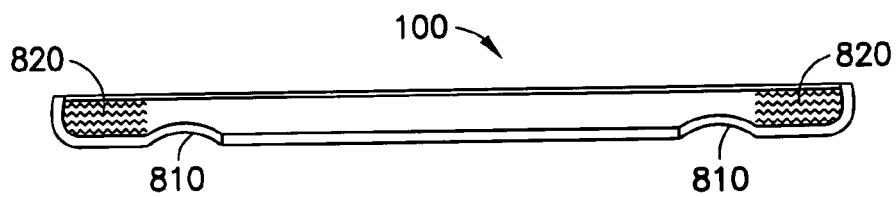
FIG. 8a shows a schematic side view of an apparatus according to an example embodiment of the invention in an unbent position.
Figure 8B:
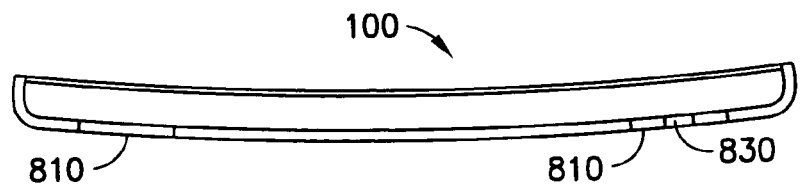
FIG. 8b shows a schematic side view of an apparatus according to an example embodiment of the invention in a concavely bent position.
Figure 8C:
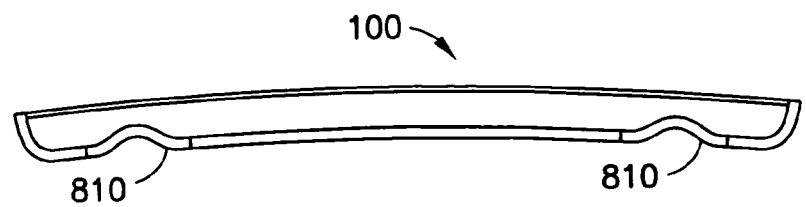
FIG. 8c shows a schematic side view of an apparatus according to an example embodiment of the invention in a convexly bent position.

FIGS. 8a to 8c show a schematic side view of an apparatus according to an example embodiment of the invention in an unbent, in a concavely bent and in a convexly bent position, respectively. The apparatus 100 comprises, instead of, or in addition to the elastic frame 340, elastic sections 810 in the back cover of the apparatus 100. The elastic sections 810 are configured to provide the at least two neutral planes hereinbefore described. In an example embodiment, the side walls or ends of the device 100 comprise rigid portions 820. In a further example embodiment, the resilient sections 810 comprise sensors or further sensing elements for receiving user input, such as touch sensitive surfaces, for detecting e.g. deformation of the sections and/or grip or touch of the user. In an example embodiment, the elastic sections 810 are positioned in such a way as to be comfortably and ergonomically reachable by the fingers of the user holding the apparatus 100. In a further example embodiment, the elastic sections further comprise a hardware button, or buttons, or further user interface elements such as sliders or touch sensitive soft buttons for receiving user input.

Some use cases relating to given example embodiments of the flexible apparatus structure are presented in the following. In a first use case the power consumption of the apparatus, e.g. a tablet computer, a smartphone or an e-book reader is controlled with the help of the flexible apparatus structure according to an example embodiment. When using an apparatus according to an example embodiment, the display of the apparatus is only turned on when the device is slightly bent or the grip of the user is detected with the elastic sections. As the device is placed for example on a table in an unbent state, the display is switched off and accordingly, the power consumption is reduced.

In a second use case, the flexible apparatus structure according to an example embodiment is used for providing an enhanced user-interface experience. As the apparatus, e.g. a tablet computer, a smartphone or an e-book reader, is used to read or browse documents, books or a newspaper, the pages are changed intuitively by slightly bending the apparatus bringing the user an experience comparable to reading a traditional newspaper or book.

In a third use case, the flexible apparatus structure according to an example embodiment is used for providing an enhanced privacy for the user. As the apparatus, e.g. a tablet computer, a smartphone or an e-book reader, is used to view private or confidential material, for example in an airplane, the user can slightly bend the apparatus with the glass window comprising a privacy filter or with a separate privacy filter and thus reduce the viewing angle of the display preventing external persons from viewing the content shown on the display more efficiently than with a privacy filter on an unbent display. Furthermore, the apparatus may be configured in such a way that the display is only turned on when the user bends the apparatus, thus further increasing privacy.

Without in any way limiting the scope, interpretation, or application of the claims appearing below, a technical effect of one or more of the example embodiments disclosed herein is to provide a flexible apparatus comprising a display with an increased scratch resistance, shine, smoothness and hardness. Another technical effect of one or more of the example embodiments disclosed herein is to provide a thin flexible device with large surfaces. Another technical effect of one or more of the example embodiments disclosed herein is to provide a flexible apparatus with a pleasing design. Another technical effect of one or more of the example embodiments disclosed herein is to provide a flexible apparatus with improved sealing and impact resistance. Another technical effect of one or more of the example embodiments disclosed herein is to provide an enhanced user experience and interface.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
   a front cover comprising a glass window;
   a back cover; and
   an elastic frame; wherein
      the elastic frame is configured to deform for compensating the relative movement of the front and back cover and to form at least a first neutral plane and a second neutral plane, the length of which first and second neutral plane does not change as the apparatus is bent; and wherein
      the position of the first neutral plane corresponds to the position of the glass window and the position of the second neutral plane corresponds to the position of the back cover.

2. An apparatus according to claim 1, wherein the elastic frame is configured to form at least one further neutral plane.

3. An apparatus according to claim 1, wherein the apparatus further comprises a resilient internal structure configured to substantially maintain the distance between the front cover and the back cover.

4. An apparatus according to claim 3, wherein the resilient internal structure comprises a resilient material or a resilient structure.

5. An apparatus according to claim 3, wherein the resilient internal structure comprises at least one substantially rigid pillar.

6. An apparatus according to claim 1, wherein the glass window is attached from the rim thereof to the elastic frame.

7. An apparatus according to claim 1, further comprising a touch sensitive display attached to the glass window.

8. An apparatus according to claim 1, wherein the back cover further comprises elastic sections.

9. An apparatus according to claim 8, wherein the elastic sections comprise sensing elements for receiving user input.

10. An apparatus according to claim 1, wherein the glass window further comprises at least one optical grating for changing the viewing angle through the glass window when bent.

11. An apparatus according to claim 1 further comprising
    a memory;
    a communications unit; and
    a processor.

12. An apparatus according to claim 11, wherein the processor is configured to change an operating mode of the apparatus or receive user input in response to the apparatus being bent.

13. An apparatus according to claim 11, wherein the apparatus comprises at least one of a tablet computer, a smartphone, an e-book reader or a display.

* * * * *